United States Patent [19]

Simms

[11] 4,219,632

[45] Aug. 26, 1980

[54] LOW MOLECULAR WEIGHT ISOCYANATO-ACRYLATE COPOLYMERS

[75] Inventor: John A. Simms, Wilmington, Del.

[73] Assignee: E. I. Du Pont de Nemours and Company, Wilmington, Del.

[21] Appl. No.: 17,073

[22] Filed: Mar. 2, 1979

[51] Int. Cl.$^2$ .......................... C08F 4/04; C08F 4/32; C08F 226/00

[52] U.S. Cl. .................................. 526/218; 526/227; 526/232; 526/232.1; 526/312; 260/31.2 N; 260/31.4 R; 260/32.8 N; 260/33.6 UA

[58] Field of Search ............... 526/312, 218, 277, 232, 526/232.1; 260/31.2 N, 31.4 R, 33.6 UA, 32.8 N

[56] References Cited

U.S. PATENT DOCUMENTS

| | | | |
|---|---|---|---|
| 2,718,516 | 9/1955 | Bortnick | 526/312 |
| 3,076,788 | 2/1963 | Hoover | 526/312 |
| 4,075,242 | 2/1978 | Rhum et al. | 526/89 |
| 4,085,264 | 4/1978 | Seib et al. | 526/227 |

OTHER PUBLICATIONS

Vollmert et al., Die Angel. Makro Chemie 20(1971), pp. 71–101, see in particular p. 94.
Chem. Abs. 71 40315d, "Stoving Varnish Based on Acrylic Resins".
Billmeyer, J. Poly Sc., PTC #8, pp. 161–178 (1965), Characterization of M.WT Distribution in High Polymers.

*Primary Examiner*—Joseph L. Schofer
*Assistant Examiner*—Herbert J. Lilling

[57] ABSTRACT

Isocyanatoethyl methacrylate/acrylate (or other vinyl monomer) copolymers of controlled low molecular weight are produced by copolymerizing the monomers with initiators, usually peroxides, at temperatures above 120° C. The copolymers are particularly useful as curing agents for urethane coating compositions.

12 Claims, No Drawings

LOW MOLECULAR WEIGHT ISOCYANATO-ACRYLATE COPOLYMERS

BACKGROUND OF THE INVENTION

1. Field of the Invention

This invention relates to isocyanato-containing acrylic polymers of controlled relatively low molecular weight particularly useful as curing agents for urethane paints and enamels.

2. Prior Art

Bortnick U.S. Pat. No. 2,718,516 shows some polymers of acrylic and methacrylic ester isocyanates.

Rhum et al. U.S. Pat. No. 4,075,242 shows the preparation of low molecular weight acrylates and methacrylates including hydroxyacrylates.

Seib et al. U.S. Pat. No. 4,085,264 shows the preparation of carboxyacrylates in the presence of polymerization initiators.

DESCRIPTION OF THE INVENTION

According to the present invention, copolymers of controlled low molecular weights are produced between (1) at least one isocyanato acrylic monomer of the formula:

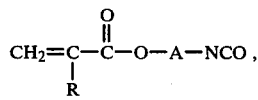

wherein R is hydrogen or methyl and A is alkylene of 2-6 carbons, and (2) at least one other acrylic or vinyl monomer of the formula

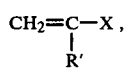

R' is hydrogen or methyl and
X is phenyl, tolyl, cyano,

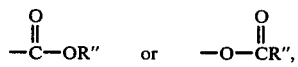

R'' being alkyl of 1–8 carbons
by heating the monomeric precursors at above 120° C. in an organic solvent and in the presence of a polymerization initiator.

Preferred isocyanato monomers of formula (1) for use in the invention are 2-isocyanatoethyl acrylate and 2-isocyanatoethyl methacrylate, although any of those of the general formula can be used. Several isocyanate monomers can be used at one time, if desired.

The preferred vinyl monomer of formula (2) is butyl acrylate, but one or more others can also be used, such as butyl methacrylate or 2-ethylhexyl acrylate. In addition, the second monomer can comprise one or more ethylenically unsaturated nonacrylic monomers, e.g., styrene, acrylonitrile, or vinyl acetate.

The monomers are preferably polymerized in substantially a 1:1 weight ratio. However, the weight can vary from about 25% to 75% of isocyanato monomer, the remainder being the other vinyl monomer.

In practice, the polymerization is done by continuously feeding monomers and initiator to a reactor containing a solvent at a temperature where the half life of the initiator is between 1 and 20 (preferably 3-10) minutes. The concentration of monomer is usually below 10% of the total of monomer, polymer and solvent in the reactor so that molecular weight will be in the desired range. The final concentration of product in solvent is usually above 60% but can range from 90 to about 30% by weight.

Reaction is carried out preferably at reflux at ambient pressure in an organic solvent of the proper boiling point, e.g., above 120° C. An upper temperature limit is about 170° C., being partially determined by the decomposition temperature of the initiator used.

Usable solvents include toluene, xylene, butyl acetate, Cellosolve ® acetate, methyl amyl ketone, and 130° C. naphtha. Preferred solvents are xylene, Cellosolve ® acetate and toluene.

A polymerization initiator is required for the polymerization. Any conventional initiator can be used which is soluble in an organic solvent and which has a half life of at least 1 minute at 120° C. Preferred initiators are organic peroxides including di-t-butyl peroxide, t-butyl peracetate, t-butyl perbenzoate, dicumyl peroxide, and the like. Also usable are azo initiators such as 2-t-butylazo-2-cyanobutane and 1-t-butylazo-1-cyanocyclohexane (Luazo ®-82 and Luazo ®-96 as advertised and sold by Pennwalt).

The molecular weight of the product is dependant on the quantity of initiator used, the initiator triggering reaction of the individual polymer chains. A mole ratio of total monomer to initiator of between about 10:1 and 40:1 is usable with about 14:1 to 30:1 being preferred.

Reaction time is not critical but about 3-4 hours is satisfactory for addition of the monomers and (decomposable) initiator followed by a holding time of half an hour at temperature.

The products can be separated from solvent by simple distillation but for many uses need not be separated. They are polydispersed random copolymers carrying about 2-20% NCO and having a number-average molecular weight $\overline{M}_n$ below 4000, preferably between about 1000 and 2000. The weight-average molecular weight $\overline{M}_w$ must be below about 8000, usually between about 8000 and 2000, to provide adequate flow of product in coating compositions. Both $\overline{M}_n$ and $\overline{M}_w$ are discussed in texts on polymers, e.g., Odian, *Principles of Polymerization*, McGraw-Hill, pp. 19-24 (1970). Although other procedures are available, gel permeation chromatography is the method used here for determining $\overline{M}_n$ and $\overline{M}_w$, and values given are relative to polystyrene standards.

The copolymers are colorless liquids or solids soluble in organic solvents and having molecular weights and viscosities suitable for use in coating applications, particularly as curing agents for urethane coating compositions. In such uses, they are combined with hydroxyl-functional acrylic, polyester or polyether polymers in proportions so that the NCO/OH ratio is between 0.8/1 and 1.2/1. They can also be used as moisture-curing film formers, in which case the reaction results in urea crosslinks.

There follow some examples illustrating the invention in more detail. In these examples, parts and percentages are by weight unless otherwise indicated, and temperatures are in degrees centigrade. A comparative example is included after Example 6.

EXAMPLE 1

Peroxide-Initiated Isocyanatoethyl Methacrylate/Butyl Acrylate

In a 3-necked flask, 150 g of xylene was heated to reflux. A mixture of 150 g each of isocyanatoethyl methacrylate and butyl acrylate was prepared and added to the refluxing xylene at a rate of 1.69 cc/min. over a period of three hours, the temperature rising from 137° to 145°. Simultaneously with the monomers was added 21.3 g of Lupersol ® 70 (Wallace and Ternan, Inc.; 75% t-butyl peracetate in inert mineral spirits) at a rate of 0.13 cc/min., addition continuing for fifteen minutes after that of the monomer was stopped. The total mole ratio of monomers to peroxide was 17.6/1. After addition of initiator was complete, the mixture was held for 30 minutes at a temperature of 143°–144° and the heat then cut off.

Analysis of the solution of isocyanatoethyl methacrylate/butyl acrylate polymeric product showed: Gardner-Holdt viscosity=F (1.40 stokes); % solids=68.48 (calc. 68.17); % NCO=7.91 (calc. 8.62); $\overline{M}_n$=2000; $\overline{M}_w$=6400. A rerun of the experiment gave % NCO=7.64.

EXAMPLE 2

Into a 3-necked flask fitted for distillation under nitrogen and also for addition polymerization was charged 200 g of Cellosolve ® acetate. 50 g of the solvent was distilled off to insure dryness of equipment and solvent and the equipment switched for addition polymerization.

A mixture of 150 g of isocyanatoethyl methacrylate, 150 g of butyl acrylate and 16 g of t-butyl perbenzoate was added to the refluxing Cellosolve ® acetate at 1.77 cc/min. over a period of three hours. The total mole ratio of monomers to peroxide initiator was 26/1. The reflux temperature rose from 147° to 160° during the three-hour period. Heating was maintained for an additional 30 minutes, the temperature falling to 157°.

Upon cooling, the isocyanatoethyl methacrylate/butyl acrylate showed: Gardner-Holdt viscosity=H (2.00 stokes); % solids=68.94 (calc. 67.88); % NCO=7.56 (calc. 8.87); $\overline{M}_n$=1350; $\overline{M}_w$=4900.

EXAMPLE 3

200 g of Cellosolve ® acetate was placed in a three-necked flask with a Y-attachment fitted for distillation under nitrogen in one phase and for reflux in another. 50 g of the solvent was distilled off and the apparatus switched to reflux.

A mixture of 150 g of isocyanatoethyl methacrylate and 150 g of butyl acrylate was added to the refluxing Cellosolve ® acetate over a period of 180 minutes and 25 g of t-butyl perbenzoate, over a period of ten minutes longer, the ratio of total monomers to initiator being 16.6/1. Reflux temperature was held for 30 minutes after addition of peroxide stopped. Temperature during reflux rose from 153° to 167°.

Analysis of the isocyanatoethyl methacrylate/butyl acrylate polymeric product showed: Gardner-Holdt viscosity=H (2.00 stokes); % solids=70.17 (calc. 68.4); % NCO=7.8 (calc. 8.6); $\overline{M}_n$=1200; $\overline{M}_w$=5300.

EXAMPLE 4

Isocyanatoethyl Methacrylate/Styrene

A mixture of 27.2 g of toluene and 136.2 g of Cellosolve ® acetate was heated to reflux (136°). After 40 minutes, a mixture of 163.4 g of isocyanatoethyl methacrylate and 163.48 g of styrene was added over 180 minutes while 27.2 g of Lupersol ® 70 (75% t-butyl peracetate in mineral spirits) was simultaneously added but over 195 minutes. The mole ratio of monomers to initiator was 17/1. During the heating, the temperature rose to 149°. After the addition of initiator was complete, temperature (145.5°) was held for 15 minutes, then discontinued.

The product was thinned with 119.9 g of ethyl acetate and analyzed: % solids=56.40; % NCO=6.43, 91.88% of theoretical; Brookfield viscosity=229.4 cps (100 rpm, #2 spindle); $\overline{M}_n$=2000; $\overline{M}_w$=7800; and d=3.6.

EXAMPLE 5

Isocyanatoethyl Methacrylate/Styrene/Butyl Acrylate

In a substantial repetition of the procedure of Example 4, to refluxing (138.5°) toluene (27 g) and Cellosolve ® acetate (136 g) was added a ternary mixture of isocyanatoethyl methacrylate (163 g), butyl acrylate (81 g) and styrene (81 g) over 180 minutes. Simultaneously, but over 195 minutes, 27 g of Lupersol ® 70 initiator was added, the temperature rising to 149.5°. After addition of the Lupersol ® (mole ratio of monomers to initiator=16/1) temperature (147°) was held for 15 minutes, heating stopped and 95 g of ethyl acetate added as a thinner.

The product analyzed: % solids=58.23; % NCO=6.92, 96% of theoretical; Brookfield viscosity=138.5 cps. Brookfield viscosity fell to 102.4 cps when ethyl acetate (33 g) was added to thin to 55% solids; $\overline{M}_n$=1900; $\overline{M}_w$=6900, and d=3.6.

EXAMPLE 6

Azo-Initiated Isocyanatoethyl Methacrylate/Butyl Acrylate

A toluene (25 g), Cellosolve ® acetate (100 g) mixture was heated to reflux (137°). A mixture of isocyanatoethyl methacrylate (150 g) and butyl acrylate (150 g) was added thereto over a period of 3 hours. Simultaneously, but over 3½ hours, was added 25 g of Luazo ®-96 (Pennwalt; 1-t-butylazo-1-cyanocyclohexane), temperature rising to 150° (mole ratio of monomers to initiator=16.3/1). Temperature was held at 149°–148° for 15 minutes, the heat was cut off, and 105 g of ethyl acetate was added as thinner.

The product analyzed: & solids=54.42; % NCO=6.94, 96.8% of theoretical; Brookfield viscosity=70 cps; $\overline{M}_n$=2400; $\overline{M}_w$=7000.

COMPARATIVE EXAMPLE

Preparation at Temperature Below 120°

A mixture of 100 g of toluene and 20 g of ethyl acetate was heated to reflux (98°) in a flask with reflux condenser and dropping funnels. A mixture of 150 g of methyl methacrylate and the same amount of isocyanatoethyl methacrylate was added at 1.67 cc/min. over a period of 3 hours. 30 g of t-butyl perpivalate in 40 g of ethyl acetate was added simultaneously with the acrylate (monomer/initiator mole ratio of 14.3/1) but at 0.39 cc/min. and for 20 min. longer. Temperature varied between 96.5 and 99 in this period and was held for 30 min. after addition of the perpivalate was complete.

Analysis showed the isocyanatoethyl methacrylate/methyl methacrylate polymer to have: Gardner-Holdt viscosity lower than Z=6 (<148.00 stokes); % solids=66.82; $\overline{M}_n$=3900; and $\overline{M}_w$=10,500.

As noted, the copolymers of this invention are suitable for use in coating applications. Thus they can provide cross-linked, thermoset films by baking with diols or polyols (cf. coassigned Brixius and Simms Ser. No. 819,121). Their controlled low molecular weights, make them particularly desirable as curing agents for urethane coating compositions, as indicated by the following:

WEATHERING TESTS

Weathering tests were made by coating steel panels with a commercial Imron ® blue urethane enamel and curing them with various curing agents as noted in the table below (Imron ® is a trademark of E. I. du Pont de Nemours and Company). The commercial enamel chosen is based on a major proportion of an acrylate polyol which forms a urethane upon curing with an isocyanate. The polyol is prepared as in Example 2 of coassigned Brixius and Simms, Ser. No. 819,121 and is held in an organic solvent with minor proportions of an ultraviolet light absorber and of pigments.

The curing agent tested was combined with the paint at the time of application so that 1.15 equivalent of isocyanate was provided for each equivalent of hydroxyl as in preferred commercial practice. The panels carrying the cured coatings were exposed at 5° south to the Florida sun for three months. Gloss was measured optically with a 20°-incident and a 20°-viewing angle at the beginning of the three-month period and at the end. Tests were made with (I) a commercial curing agent for Imron ®, Desmodur N, (II) an isocyanatoethyl methacrylate of controlled molecular weight prepared with a mercaptan as a chain-transfer agent, and copolymers prepared above 120° as in (III) Example 1 and (IV) Example 2, above.

The results of the tests were as follows:

TABLE

| Test | Curing Agent | Initial 20° Gloss | 3 Months 20° Gloss | % Retention |
|---|---|---|---|---|
| I | Desmodur N (Note 1) | 78 | 61 | 78 |
| II | Copolymer prepared with mercaptan (Note 2) | 71 | 52 | 74 |
| III | Copolymer prepared with t-butyl peracetate | 80 | 72 | 91 |
| IV | Copolymer prepared with t-butyl perbenzoate | 79 | 72 | 91 |

NOTE 1:
Desmodur N is the isocyanate of the formula

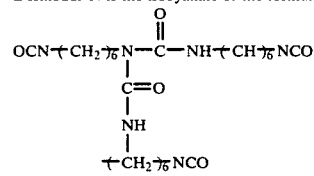

commonly used as a curing agent for urethanes at the time of application.
NOTE 2:
The isocyanatoethyl methacrylate copolymer had molecular weights $\overline{M}_n$ = 1900 and $\overline{M}_w$ = 5600 and was prepared with lauryl mercaptan as a chain-transfer agent according to Example 3 of coassigned Brixius and Simms S.N. 819,121.

The results of the tests clearly indicate the superiority of the copolymers of this invention as curing agents for urethanes.

I claim:

1. The process of preparing a copolymer of controlled low molecular weight as measured by gel permeation chromatography of
   (1) at least one compound of the formula

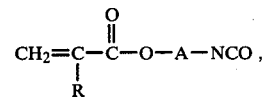

wherein R is hydrogen or methyl and A is alkylene of 2-14 carbons, and
   (2) at least one compound of the formula

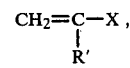

wherein R' is hydrogen or methyl and X is phenyl, tolyl, cyano,

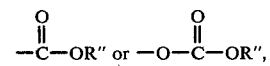

R" being alkyl of 1-8 carbons; which comprises
   heating the precursor monomers together in an organic solvent at a temperature above 120° C. and
   in the presence of a polymerization initiator soluble in an organic solvent and having a half life of at least 1 minute at 120° C., the mole ratio of total monomers to initiator being between about 10:1 and 40:1.
2. The process of claim 1 wherein the mole ratio of total monomers to initiator is between 14:1 and 30:1.
3. The process of claim 1 wherein the initiator is an organic peroxide.
4. The process of claim 1 wherein the initiator is an azo compound.
5. The process of claim 1 comprising heating together isocyanatoethyl methacrylate and butyl acrylate.
6. The process of claim 1 comprising heating together isocyanatoethyl methacrylate and styrene.
7. The process of claim 1 comprising heating together isocyanatoethyl methacrylate, butyl acrylate and styrene.
8. A copolymer of
   (1) between 75-25% by weight of at least one compound of the formula

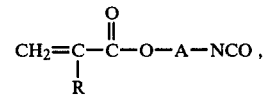

wherein R is hydrogen or methyl and A is alkylene of 2-14 carbons, and
   (2) at least one compound of the formula

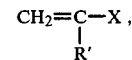

wherein R' is hydrogen or methyl and X is phenyl, tolyl, cyano,

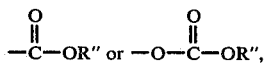

R″ being alkyl of 1-8 carbons;

said copolymer having 2-20% by weight NCO, a number average molecular weight $\overline{M}_n$ below 4000 and a weight average molecular weight $\overline{M}_w$ below 8000, molecular weights being in accord with gel permeation chromatography.

9. A copolymer of claim 8 of the monomers isocyanatoethyl methacrylate and butyl acrylate.

10. A copolymer of claim 8 of the monomers isocyanatoethyl methacrylate and styrene.

11. A copolymer of claim 8 of the monomers isocyanatoethyl methacrylate, butyl acrylate and styrene.

12. A solution of a copolymer of claim 8 in an organic solvent, said solution containing 30-90% by weight of solids.

* * * * *